US012734542B2

(12) United States Patent
Shih

(10) Patent No.: US 12,734,542 B2
(45) Date of Patent: Sep. 15, 2026

(54) SPRINKLER STRUCTURE

(71) Applicant: AMPLE-XIN CO., LTD., Xiushui Township, Changhua County (TW)

(72) Inventor: Wei-Ting Shih, Xiushui Township, Changhua County (TW)

(73) Assignee: AMPLE-XIN CO., LTD., Changhua County (TW)

( * ) Notice: Subject to any disclaimer, the term of this patent is extended or adjusted under 35 U.S.C. 154(b) by 275 days.

(21) Appl. No.: 18/585,007

(22) Filed: Feb. 22, 2024

(65) Prior Publication Data

US 2024/0416377 A1 Dec. 19, 2024

(30) Foreign Application Priority Data

Jun. 14, 2023 (TW) ................................ 112122212

(51) Int. Cl.
*B05B 15/62* (2018.01)
*B05B 3/04* (2006.01)

(52) U.S. Cl.
CPC ............ *B05B 15/62* (2018.02); *B05B 3/0438* (2025.08)

(58) Field of Classification Search
CPC ......... B05B 15/68; B05B 15/65; B05B 15/62; B05B 1/1645; B05B 1/1672; B05B 1/202; B05B 3/0438; Y10S 239/01
See application file for complete search history.

(56) References Cited

U.S. PATENT DOCUMENTS 5,205,490 A * 4/1993 Steinhardt ............. B05B 1/1636 239/447
11,161,137 B2 * 11/2021 Duong .................. B05B 3/0438
2018/0178238 A1 * 6/2018 Farra ....................... B05B 15/68

* cited by examiner

*Primary Examiner* — Christopher R Dandridge

(57) ABSTRACT

A sprinkler structure includes: a base; a spray holder swingably disposed on the base; a water feeding valve holder having an end fitted to the spray holder and the end having at least two water pipes inserted into the chamber; a lid for covering an opening of the spray holder by being fitted thereto, with at least two rails disposed on the upper surface of the lid and each having a position-limiting slot penetrating the lid; and at least two sprinkling units slidably disposed on the two rails of the lid and connected to two water pipes respectively. Therefore, the spray holder is capable of swinging laterally to perform spraying operation, and the two sprinkling units move along the rails to facilitate the adjustment of the sprinkling range and enhance structural variation and practicability.

9 Claims, 16 Drawing Sheets

SPRINKLER STRUCTURE

FIELD

The present disclosure relates to sprinklers, and more particularly to a sprinkler structure conducive to uniformly distributed sprinkling and sprinkling adjustment.

BACKGROUND

Referring to FIGS. 15 and 16, a conventional sprinkler comprises a base 60, two spraying pipes 70 and a distributing valve 80. A water-feeding connector 61 and two composite sleeves 62 are disposed at one end of the base 60. The two composite sleeves 62 are in communication with the water-feeding connector 61. The base 60 has a valve hole 63 corresponding in position to the water-feeding connector 61. The two composite sleeves 62 are fitted to and adapted to fix in place the two spraying pipes 70, allowing the two spraying pipes 70 to be in communication with the water-feeding connector 61. A plurality of spraying holes 71 are disposed on the surfaces of the two spraying pipes 70 and equidistantly spaced apart from each other. The distributing valve 80 is rotatably mounted on the valve hole 63. A knob of the distributing valve 80 controllably allows water to be distributed to the two spraying pipes 70 simultaneously to perform a sprinkling operation or only one single spraying pipe 70 to perform the sprinkling operation.

The drawbacks of the conventional sprinkler are explained below. The conventional sprinkler has two spraying pipes 70 whereby spraying efficiency is enhanced; however, the sprinkling operation is performed with the spraying pipes 70 at one single angle only, and in consequence water thus sprinkled falls onto the same position, leading to excessive sprinkling at the same position and uneven distribution of sprinkle. Furthermore, the spraying pipes 70 are fixed to the base 60 and thus cannot be adjusted or extended again. Last but not least, owing to the dimensions and specifications of the spraying pipes 70, the sprinkling range of the sprinkler is narrow. Therefore, there is still room for improvement in the prior art.

In view of this, the inventor of the present invention applied his expertise about manufacturing, development and design of related products to the aforesaid goal, carried out design and evaluation processes, and finally devised the invention with high industrial applicability.

SUMMARY

In view of the aforesaid drawbacks of the prior art, it is an objective of the disclosure to provide a sprinkler structure, having: a base; a spray holder swingably disposed on the base and having a hollow core with a chamber therein, wherein an opening is formed at a top of the spray holder and is in communication with the chamber; a water feeding valve holder having an end fitted to the spray holder and inserted into the chamber, wherein the end of the water feeding valve holder has at least two water pipes, and a connector is disposed at a free end of each of the water pipes; a lid for covering the opening of the spray holder by being fitted thereto, wherein at least two rails are disposed on an upper surface of the lid, each have a position-limiting slot penetrating the lid, and are each in communication with the chamber through the position-limiting slot; and at least two sprinkling units slidably disposed on the two rails of the spray holder, respectively, each having a hollow core with a water feeding space therein, wherein an upper surface of each of the sprinkling units has a plurality of sprinkling pores in communication with the water feeding space, and a lower surface of each of the sprinkling units has a water feeding hole in communication with the water feeding space, allowing the connectors of the water pipes to be fitted to the water feeding holes, the connectors each abutting against two ends of the position-limiting slots to not only limit a distance of slides of the sprinkling units along the rails but also prevent the sprinkling units from falling off the rails.

Preferably, an axle holder and a matching ring are disposed at two ends of the base, respectively, an axle is disposed at one end of the spray holder, fitted to the axle holder and adapted to rotate relative thereto, an indented portion is disposed at the other end of the spray holder to give way to the matching ring, the indented portion has an end surface facing the matching ring, a through hole is disposed on the end surface of the indented portion, and the one end of the water feeding valve holder is inserted into the through hole.

Preferably, a position-limiting groove is concavely disposed at the lowest point of the inner circumference of the matching ring and axially extended, and a position-limiting post is convexly disposed at the lowest point of the circumference of the water feeding valve holder and axially extended, achieving restrictive positioning by the engagement of the position-limiting groove and the position-limiting post.

Preferably, the blocking protruding portions are disposed at different ends of the two rails of the lid respectively, such that the two sprinkling units slide along the two rails in different directions respectively.

Preferably, a plurality of spaced-apart, inward-bending position-limiting tabs are disposed at an upper edge on each of two lateral sides of each of the rails, and a position-limiting rib expanding outward is disposed at a peripheral edge of a bottom of each of the sprinkling units, allowing the position-limiting ribs to be confined to below the position-limiting tabs while the sprinkling units are moving along the rails, so as to restrain the sprinkling units.

Preferably, the sprinkling units each comprise a bottom case and a cover fitted together, with a positioning indented portion disposed at an edge of a sidewall of the bottom case, and a positioning protruding portion disposed at an edge of the cover, achieving quick assembly of the sprinkling units by the engagement of the positioning indented portion and the positioning protruding portion.

Preferably, an engaging ring is disposed above a rim of the water feeding hole of each of the sprinkling units, engaged with the connector and fitted thereto.

Preferably, the upper surface of each of the rails of the lid has at least one positioning bump, and the lower surface of the bottom case of each of the sprinkling units has a plurality of positioning sunken holes equidistantly spaced apart from each other, further limiting the position of the sprinkling units on the rails by the engagement of each of the positioning sunken holes and a corresponding one of the positioning bumps.

Preferably, a partition board is centrally disposed at the bottom of the chamber of the spray holder and extended in the axial direction of the spray holder, and thus the two water pipes in the chamber are separated by the partition board.

Compared with the prior art, the disclosure has advantages as follows: With the spray holder being capable of swinging laterally relative to the base, water is sprayed to and fro and distributed within a fan-shaped area. Furthermore, the two sprinkling units move along the rails in different directions, so as to be pulled out in the different directions; meanwhile, the connectors of the water pipes move along the position-limiting slots such that the two sprinkling units move toward the two ends of the spray holder before being pulled out, so as to increase the sprinkling range, facilitate the adjustment of the sprinkling range, enhance structural variation and practicability, and further enhance sprinkling efficiency.

DETAILED DESCRIPTION

Objectives, features, and advantages of the disclosure are herein illustrated with specific embodiments, depicted with drawings, and described below.

Figure 1:
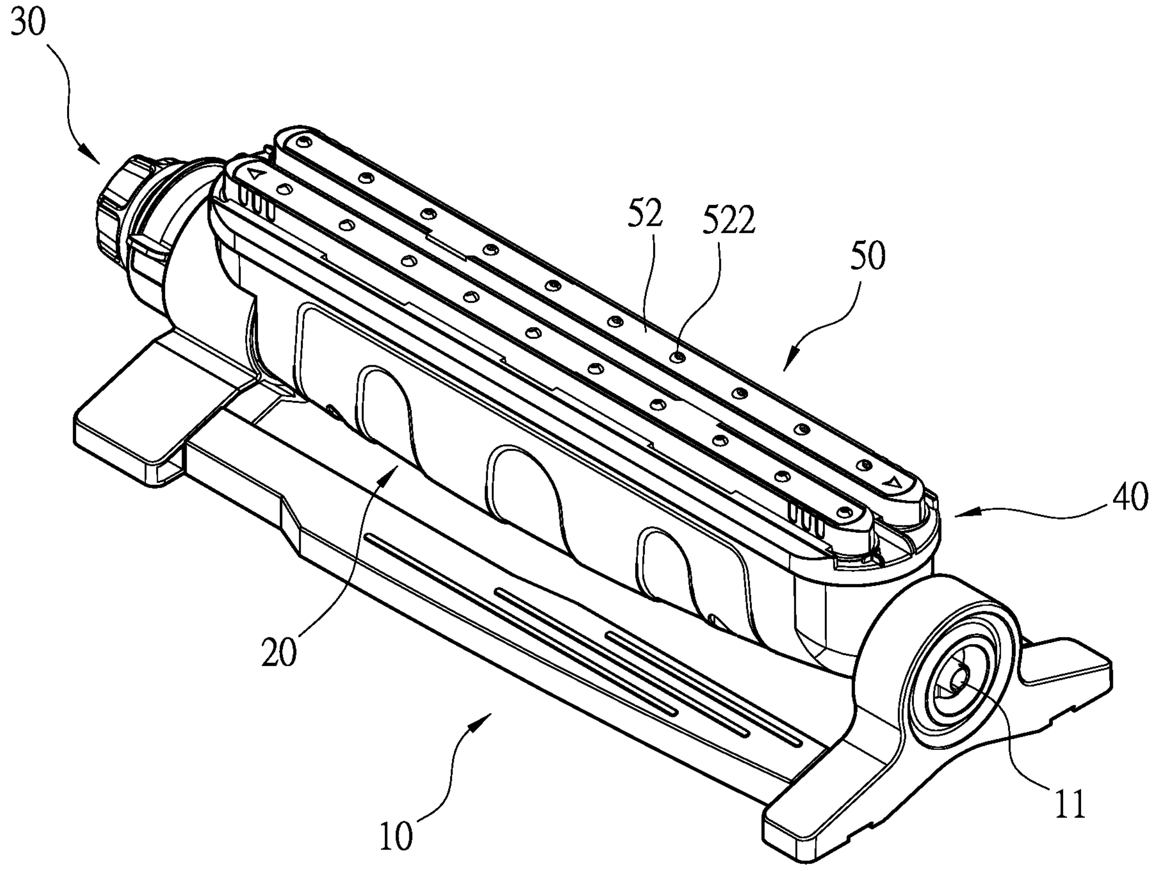
FIG. 1 is a perspective view of a sprinkler structure of the disclosure.
Figure 2:
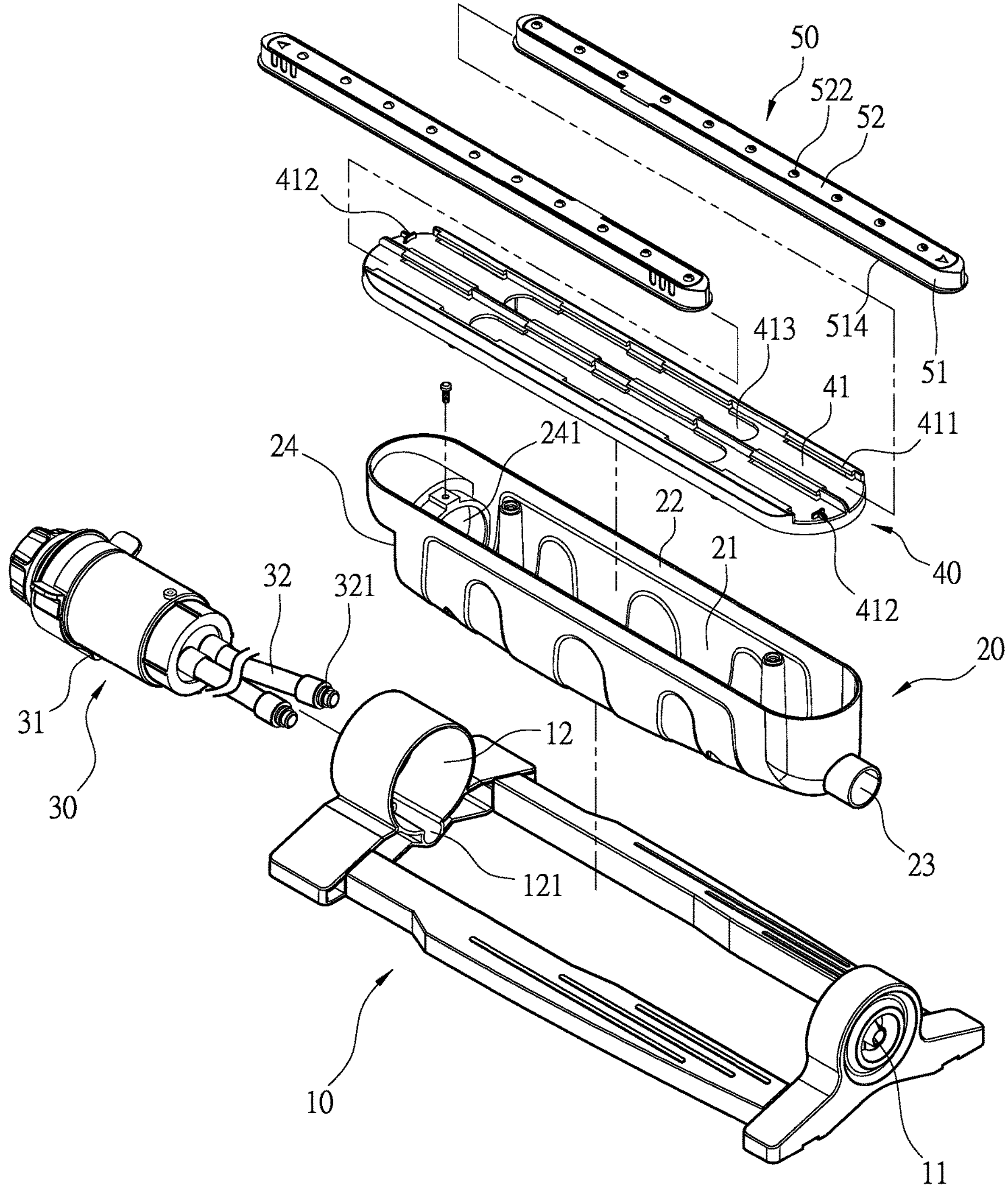
FIG. 2 is an exploded view of the sprinkler structure of the disclosure.
Figure 3:
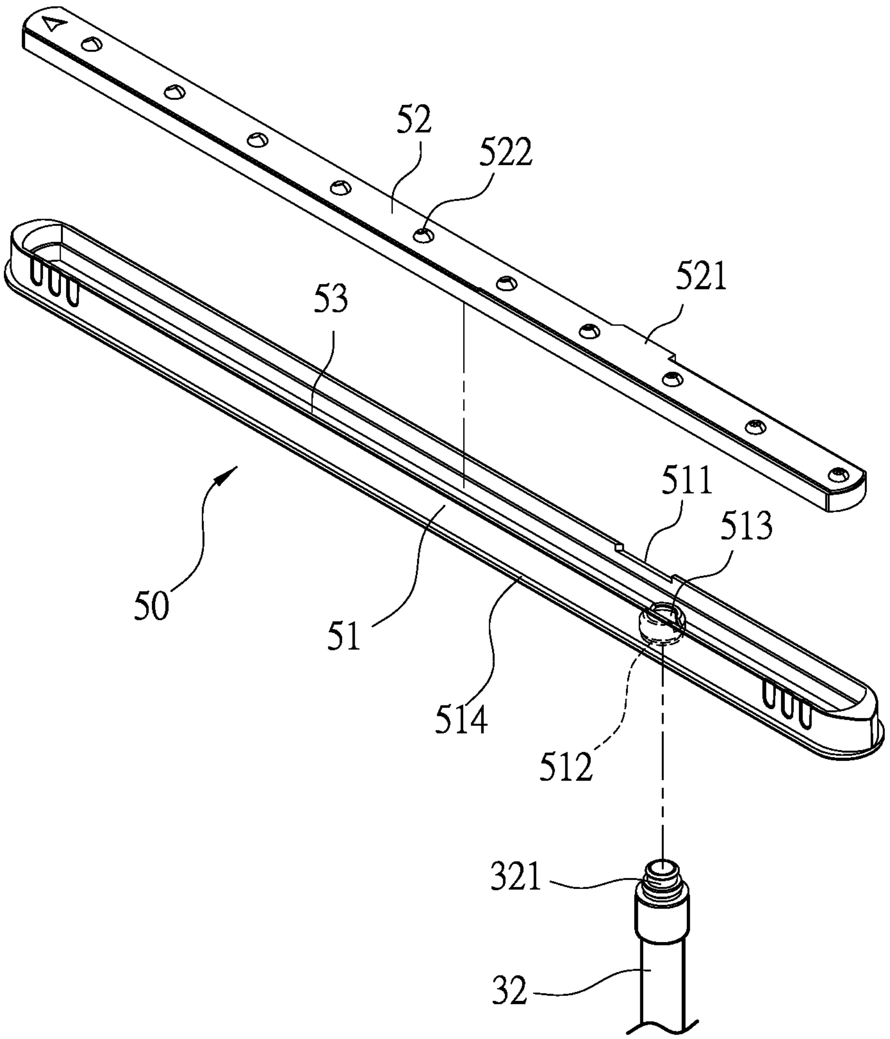
FIG. 3 is an exploded view of a sprinkling unit according to the disclosure.
Figure 4:
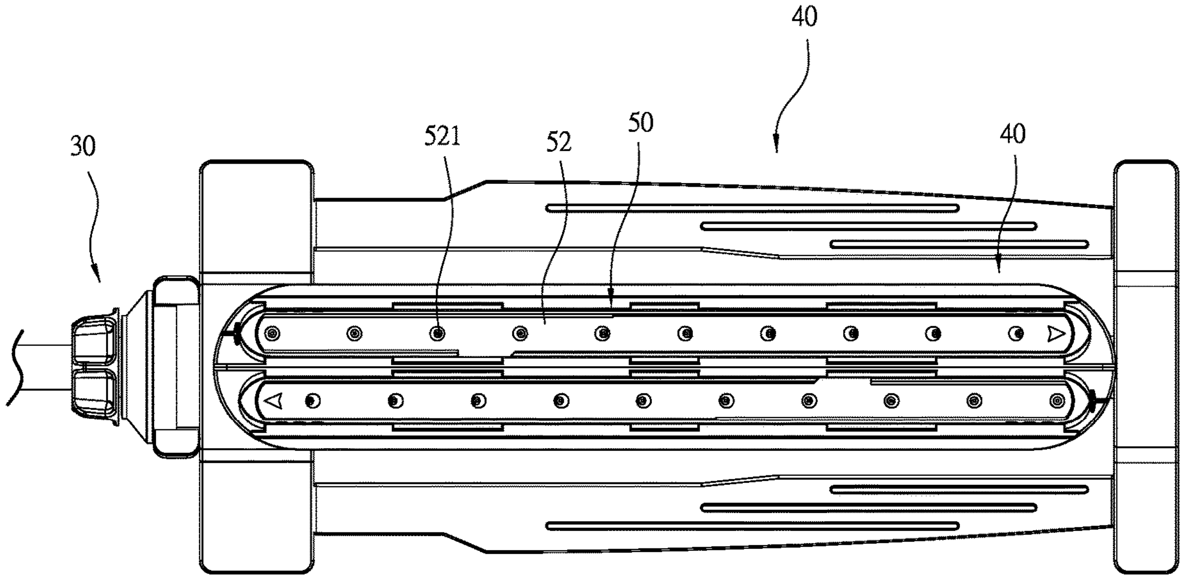
FIG. 4 is a top view of the sprinkler structure of the disclosure.
Figure 5:
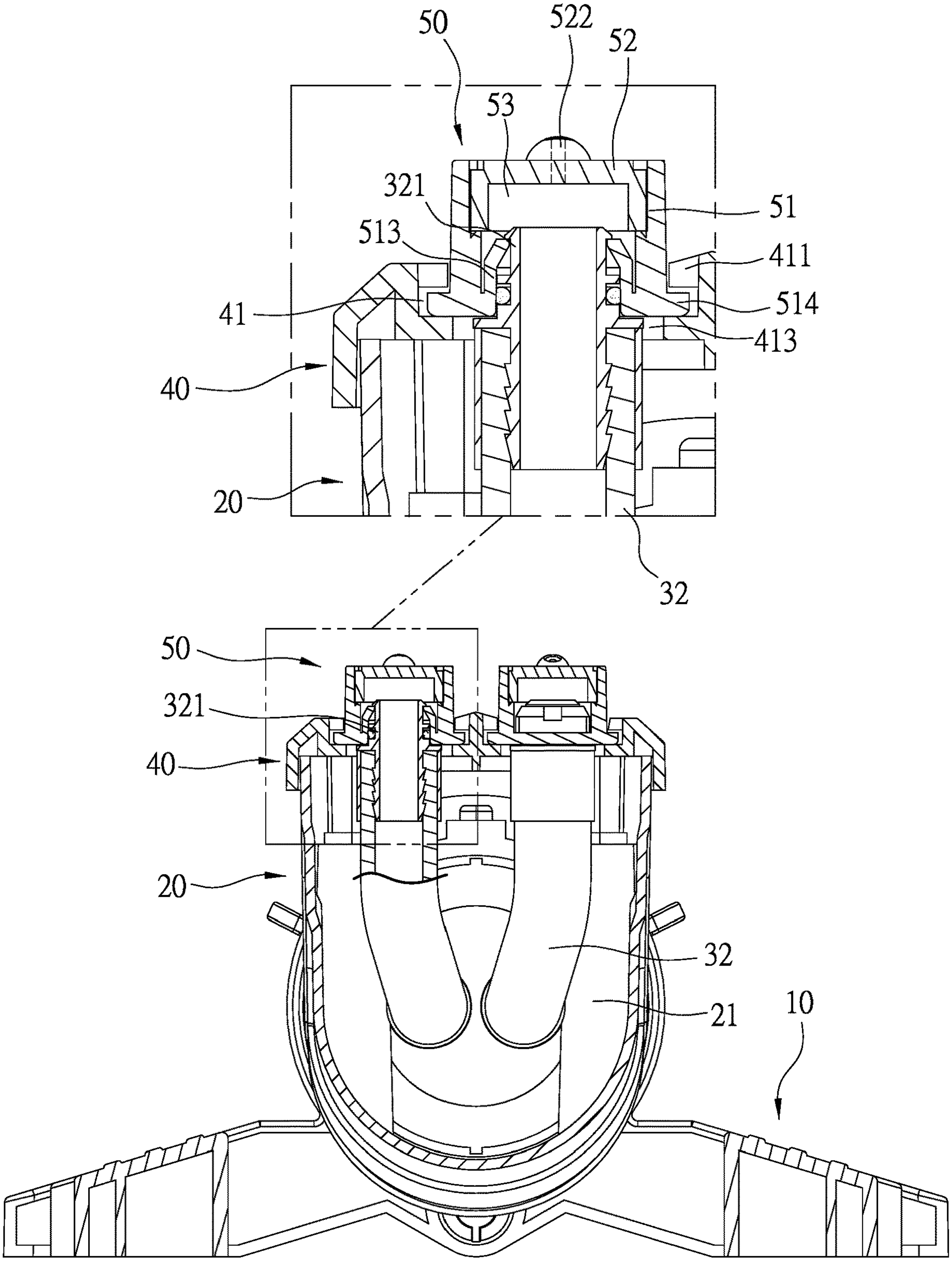
FIG. 5 depicts a cross-sectional view and a partial, enlarged schematic view of the sprinkler structure of the disclosure.
Figure 6:
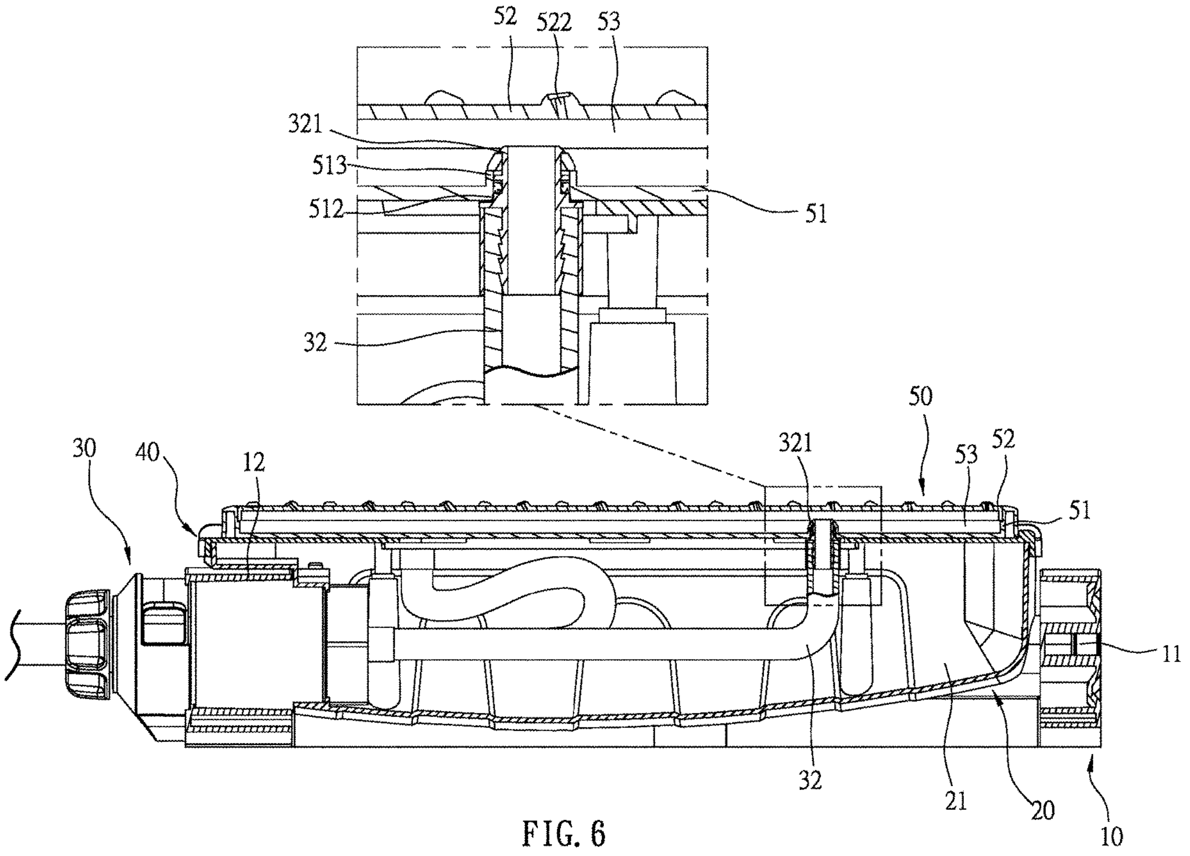
FIG. 6 depicts a cross-sectional view and a partial, enlarged schematic view, taken from another angle, of the sprinkler structure of the disclosure.

Referring to FIGS. 1, 2 and 3, a sprinkler structure comprising a base 10, a spray holder 20, a water feeding valve holder 30, a lid 40 and at least two sprinkling units 50. An axle holder 11 and a matching ring 12 are disposed at two ends of the base 10, respectively. A position-limiting groove 121 is concavely disposed at the lowest point of the inner circumference of the matching ring 12 and axially extended. The spray holder 20 has a hollow core with a chamber 21 therein. An opening 22 is formed at the top of the spray holder 20 and is in communication with the chamber 21. An axle 23 is disposed at one end of the spray holder 20, fitted to the axle holder 11 and adapted to rotate relative thereto. An indented portion 24 is disposed at the other end of the spray holder 20 to give way to the matching ring 12. The indented portion 24 has an end surface that faces the matching ring 12. A through hole 241 is disposed on the end surface of the indented portion 24. The through hole 241 is in communication with the chamber 21. After penetrating the matching ring 12, one end of the water feeding valve holder 30 is fitted to the spray holder 20. A position-limiting post 31 is convexly disposed at the lowest point of the circumference of the water feeding valve holder 30, axially extended, and adapted to engage with the position-limiting groove 121. The one end of the water feeding valve holder 30 is inserted into the chamber 21 via the through hole 241. The one end of the water feeding valve holder 30 further has at least two water pipes 32. A connector 321 is disposed at a free end of each of the water pipes 32. The lid 40 covers the opening 22 of the spray holder 20 by being fitted thereto. At least two rails 41 are disposed on the upper surface of the lid 40. A plurality of spaced-apart, inward-bending position-limiting tabs 411 are disposed at the upper edge on each of the two lateral sides of each of the rails 41. A blocking protruding portion 412 is disposed at one end of one of the rails 41, and another blocking protruding portion 412 is disposed at the other end of the other rail 41, such that the slide along one of the two rails 41 takes place in a direction opposite to the direction in which the slide along the other rail 41 takes place. The rails 41 each have a position-limiting slot 413 which penetrates the lid 40. The rails 41 are in communication with the chamber 21 through the position-limiting slots 413. The sprinkling units 50 are slidably disposed on the two rails 41 of the lid 40, respectively. The sprinkling units 50 each comprise a bottom case 51 and a cover 52 fitted together. A positioning indented portion 511 is disposed at an edge of a sidewall of the bottom case 51. A positioning protruding portion 521 is disposed at an edge of the cover 52. The joint operation of the positioning indented portion 511 and the positioning protruding portion 521 enables the quick assembly of the sprinkling unit 50. The sprinkling units 50 each have a hollow-cored water feeding space 53 jointly defined by the bottom case 51 and the cover 52. The upper surface of the cover 52 has a plurality of sprinkling pores 522 in communication with the water feeding space 53. The lower surface of the bottom case 51 has a water feeding hole 512 in communication with the water feeding space 53. An engaging ring 513 is disposed above the rim of the water feeding hole 512. A position-limiting rib 514 expanding outward is disposed at the peripheral edge of the bottom of the bottom case 51.

Referring to FIGS. 2 through 6, the spray holder 20 is fitted between the axle holder 11 and the matching ring 12 of the base 10, and then the axle 23 is fitted to the axle holder 11. Next, with the water pipes 32 leading, the water feeding valve holder 30 passes through the matching ring 12 and the through hole 241 in order to be inserted into the chamber 21 of the spray holder 20. Then, the spray holder 20 is swingably mounted in place between the axle holder 11 of the base 10 and the water feeding valve holder 30. The chamber 21 of the spray holder 20 receives the two water pipes 32. The two sprinkling units 50 are slidably disposed on the two rails 41 of the lid 40, respectively. With the blocking protruding portions 412 disposed at different ends of the two rails 41 respectively, the two sprinkling units 50 slide along the two rails 41 in different directions respectively. The position-limiting ribs 514 of the sprinkling units 50 are confined to below the position-limiting tabs 411 of the rails 41 while the sprinkling units 50 are moving along the rails 41, achieving the purpose of restraining the sprinkling units 50. Finally, the opening 22 of the spray holder 20 is covered with the lid 40, and the connectors 321 of the two water pipes 32 are fitted to the water feeding holes 512 of the sprinkling units 50 through the position-limiting slots 413. The engaging ring 513 is engaged with the connector 321 and fitted thereto. The connector 321 is disposed between the position-limiting slots 413. The connector 321 abuts against two ends of the position-limiting slots 413 to not only limit the distance of the slides of the sprinkling units 50 along the rails 41 but also prevent the sprinkling units 50 from falling off the rails 41.

Figure 7:
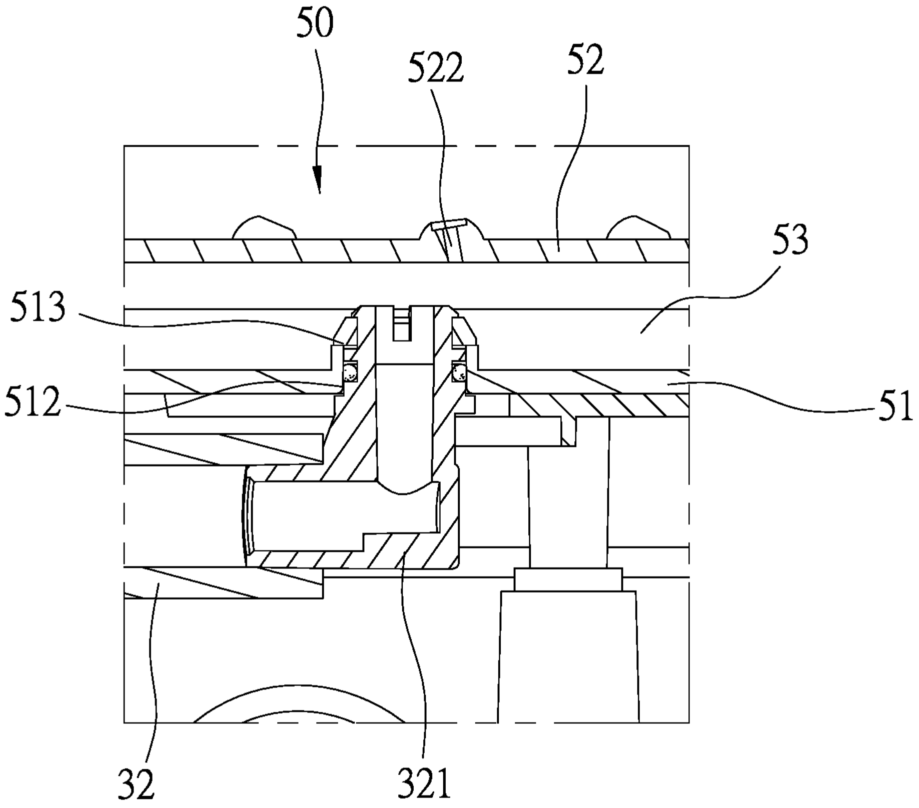
FIG. 7 is a partial, enlarged cross-sectional view of a connector provided in another form according to the disclosure.

Referring to FIG. 7, there is shown a partial, enlarged cross-sectional view of the connector 321 provided in another form according to the disclosure. As shown in the diagram, the connectors 321 of the water pipes 32 are bent to be L-shaped to not only allow the connectors 321 to be mounted at the water feeding holes 512 of the sprinkling units 50 but also prevent the water pipes 32 from bending and thus causing choking or rupture. Therefore, the sprinkler structure of the disclosure is structurally practical.

Figure 8:
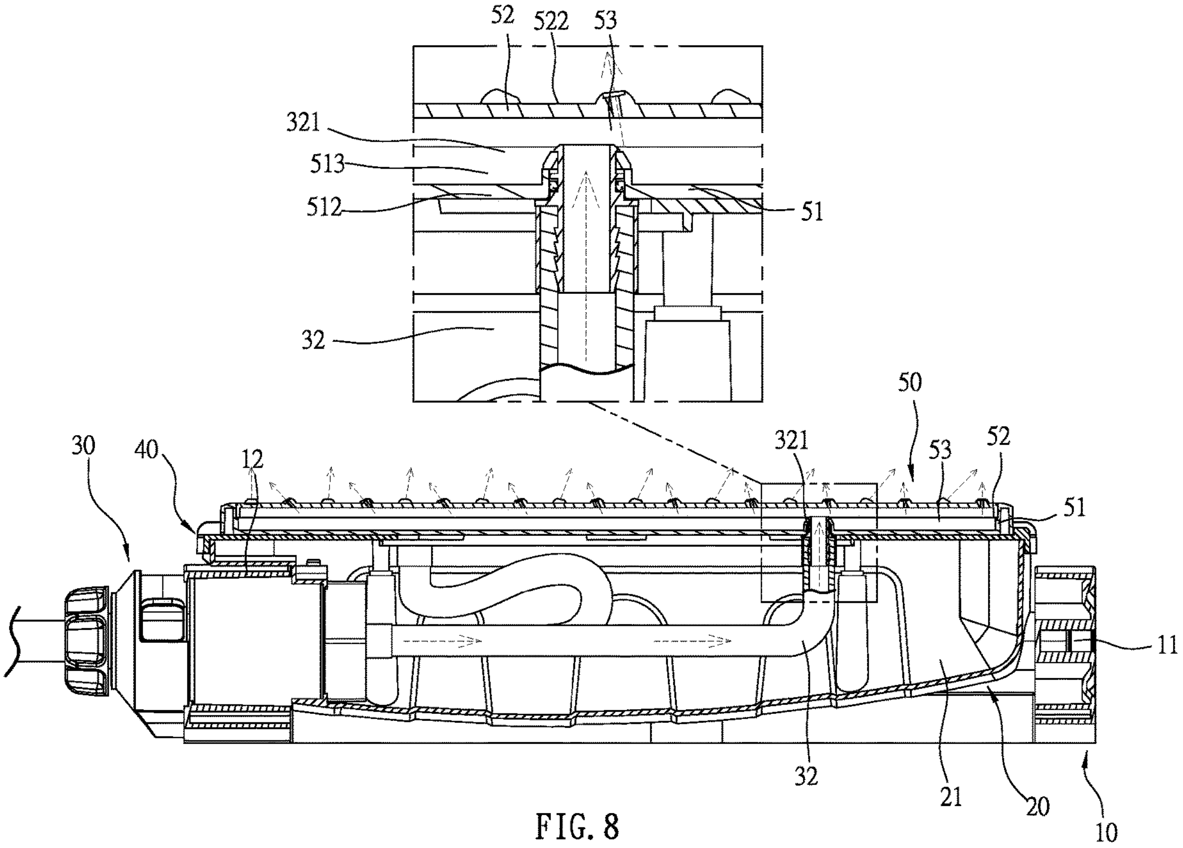
FIG. 8 depicts schematic views of how to operate the sprinkler structure of the disclosure.
Figure 9:
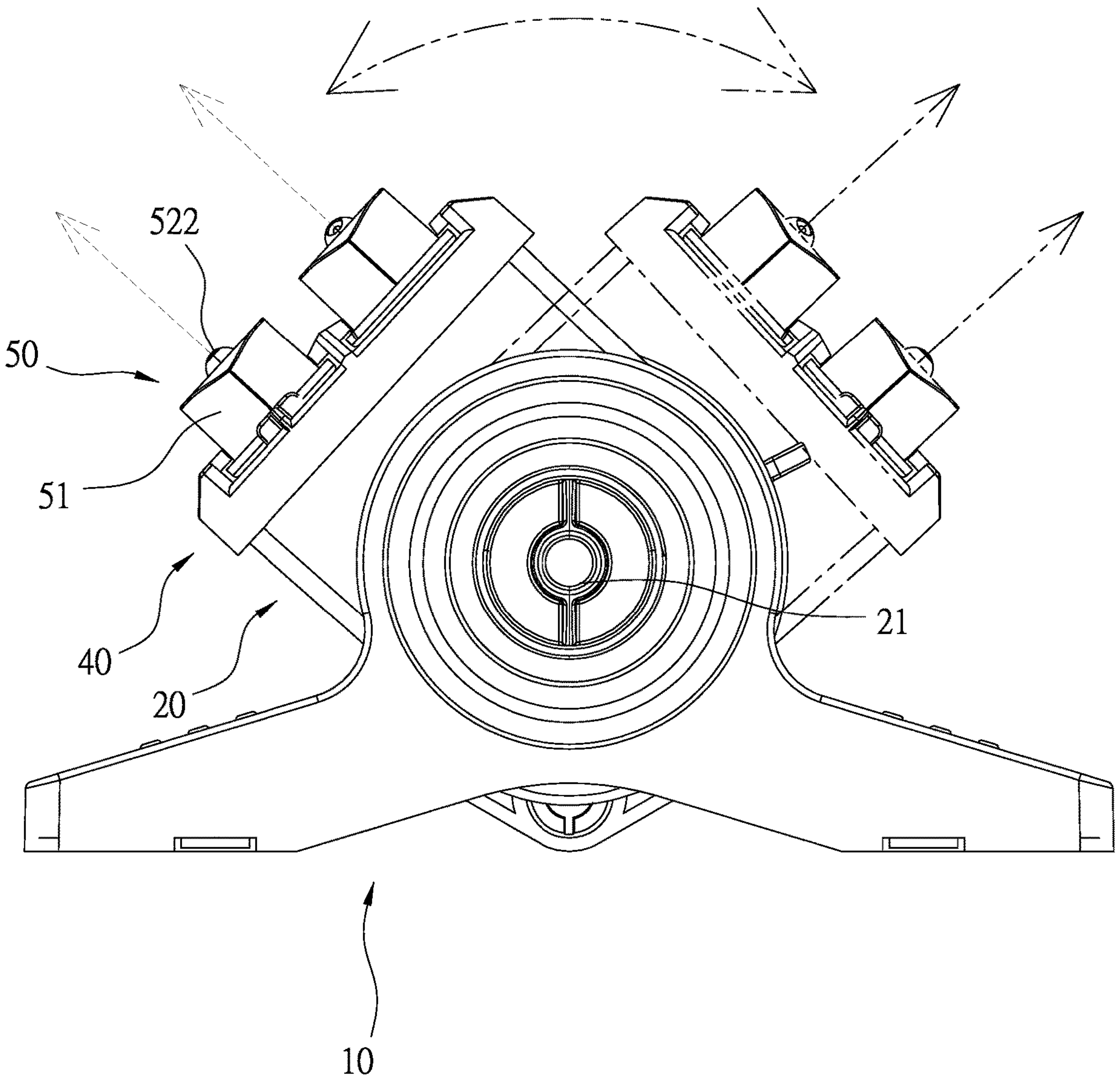
FIG. 9 is a schematic view showing a spray holder capable of swinging laterally according to the disclosure.
Figure 10:
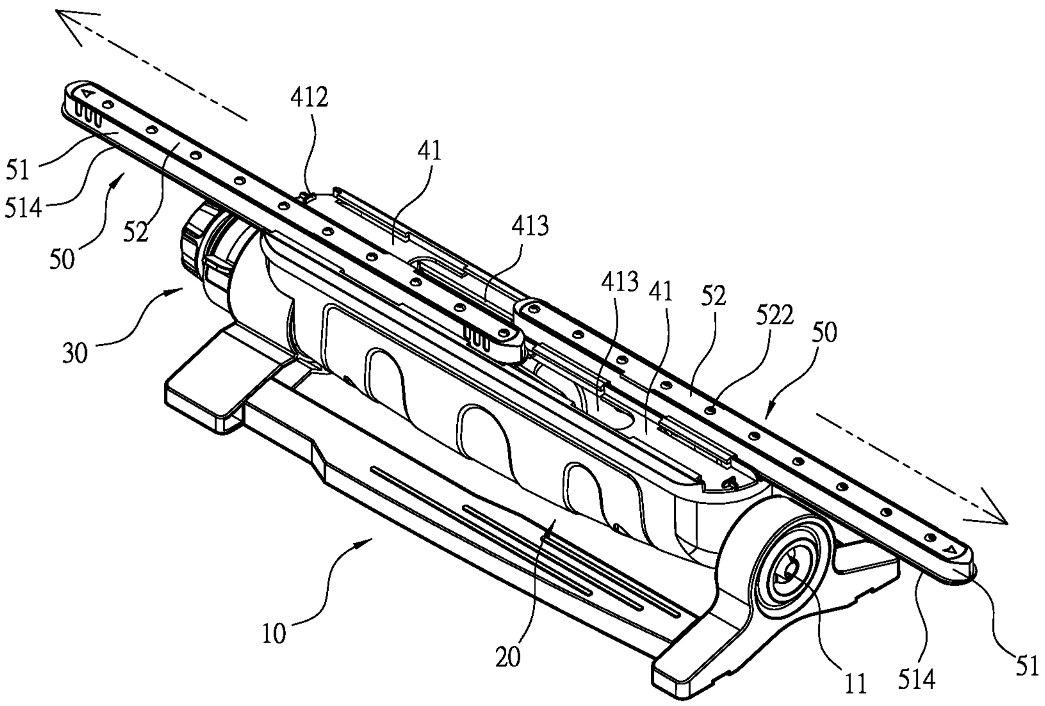
FIG. 10 is a schematic view showing the two sprinkling units pulled outward along rails according to the disclosure.
Figure 11:
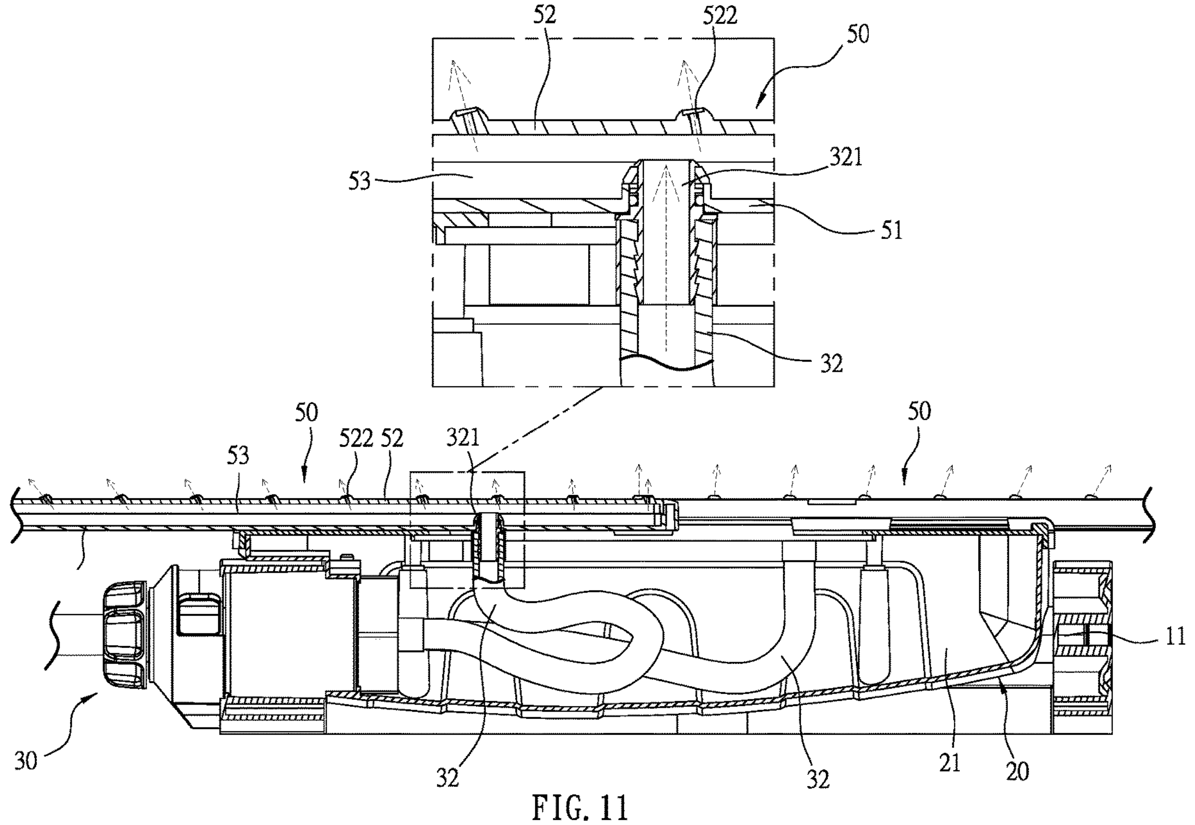
FIG. 11 depicts a cross-sectional view and a partial, enlarged schematic view which show the two sprinkling units pulled outward according to the disclosure.

Regarding the operation of the sprinkler structure of the disclosure, as shown in FIGS. 8 and 9, the outer end of the water feeding valve holder 30 is connected to a water source, and water is introduced into the water feeding spaces 53 of the two sprinkling units 50 via the two water pipes 32 before being ejected from the sprinkling pores 522. After that, with the spray holder 20 being capable of swinging laterally relative to the base 10, water is sprayed to and fro and distributed within a fan-shaped area. Furthermore, the two sprinkling units 50 move along the rails 41, as shown in FIGS. 10 and 11, in different directions, so as to be pulled out; meanwhile, the connectors 321 of the water pipes 32 move along the position-limiting slots 413 such that the two sprinkling units 50 move toward the two ends of the spray holder 20 before being pulled out, so as to increase the sprinkling range, facilitate the adjustment of the sprinkling range, enhance structural variation and practicability, and further enhance sprinkling efficiency.

Figure 12:
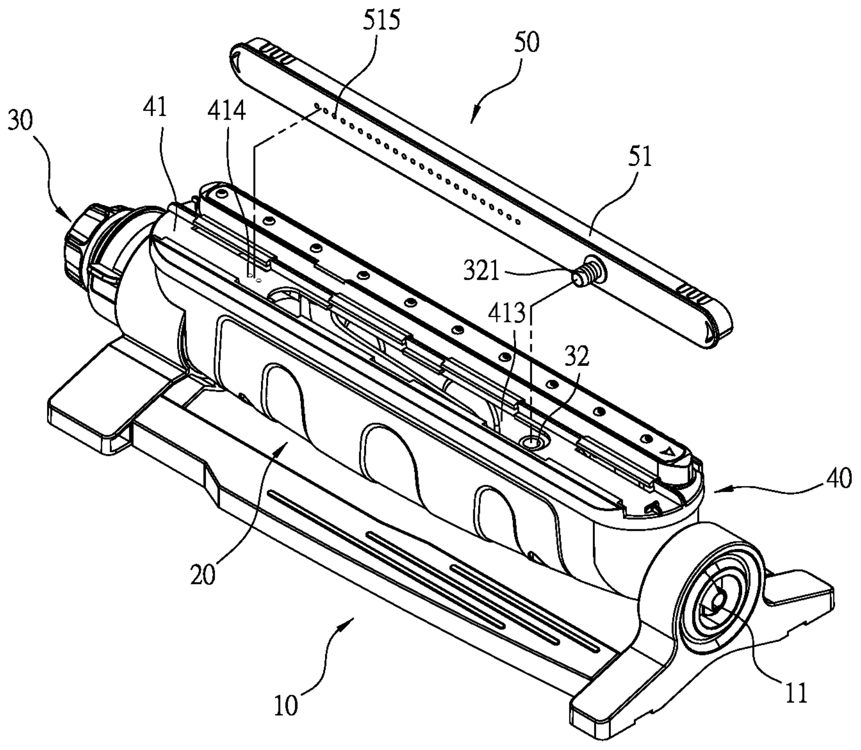
FIG. 12 is a schematic view showing positioning bumps and positioning sunken holes between each rail and a bottom case of one sprinkling unit according to the disclosure.
Figure 13:
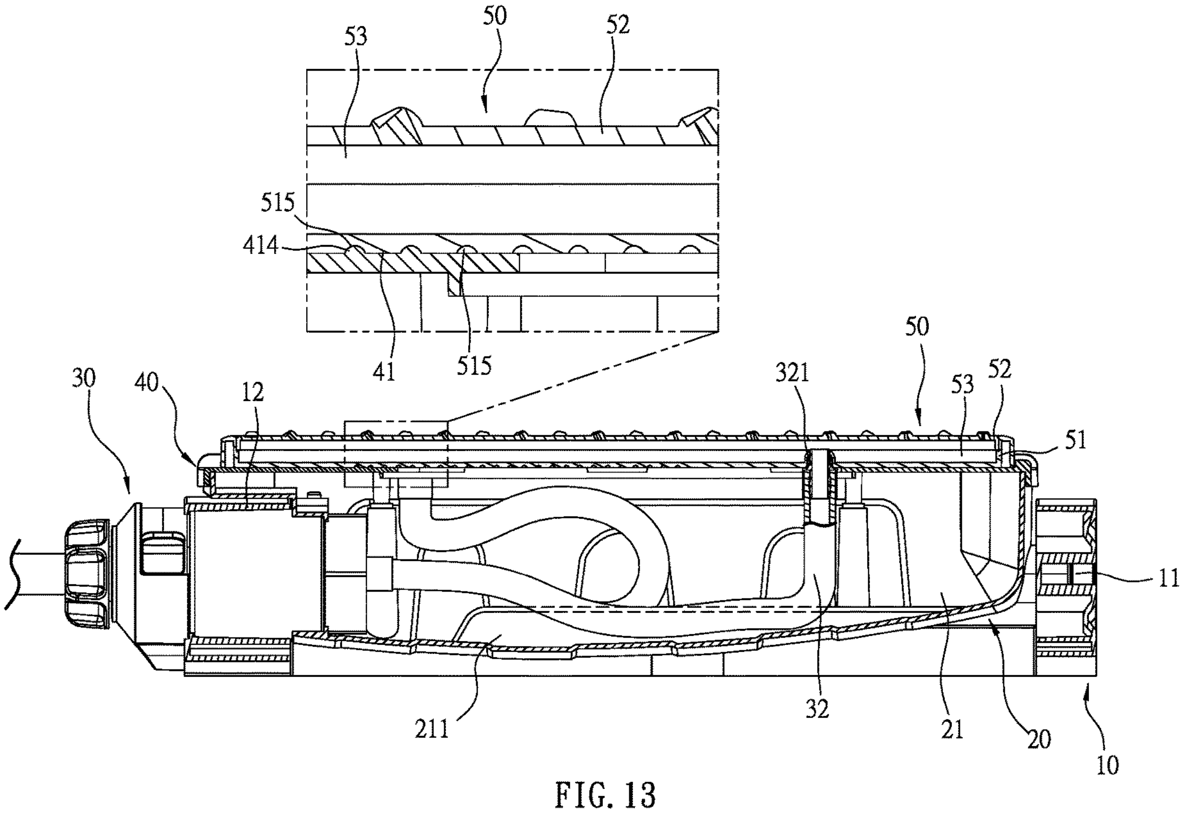
FIG. 13 depicts schematic views of how to achieve positioning by the engagement of each of the positioning bumps and a corresponding one of the positioning sunken holes between the rail and the bottom case of the sprinkling unit according to the disclosure.

Referring to FIGS. 12 and 13, the upper surface of each of the rails 41 of the lid 40 has at least one positioning bump 414, preferably two positioning bumps 414, whereas the lower surface of the bottom case 51 of each of the sprinkling units 50 has a plurality of positioning sunken holes 515 equidistantly spaced apart from each other. Given the adjustment of the displacement of the sprinkling units 50 along the rails 41, the engagement of each positioning sunken hole 515 and a corresponding one of the positioning bumps 41 further limits the position of the sprinkling units 50 on the rails 41, enhancing the sprinkling stability of the sprinkling units 50.

Figure 14:
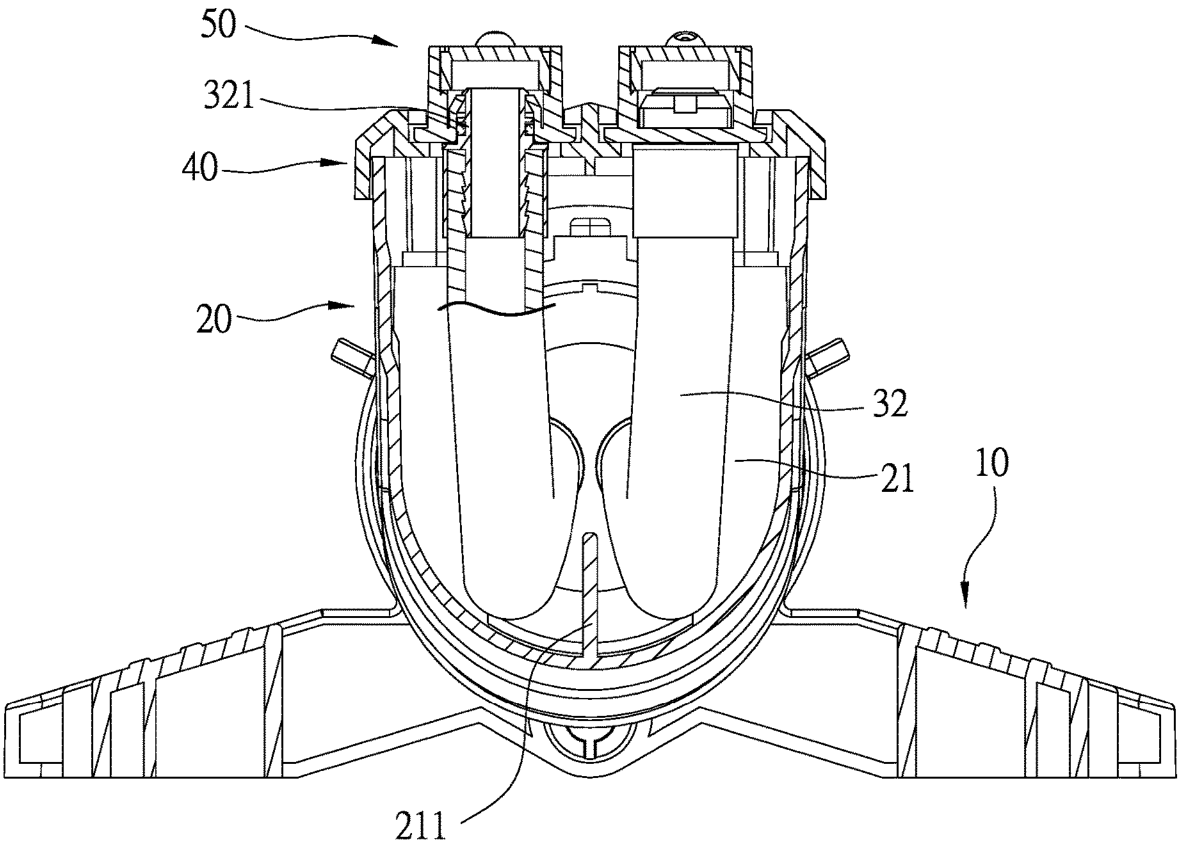
FIG. 14 is a schematic view of a partition board disposed in a chamber of the spray holder according to the disclosure.
Figure 15:
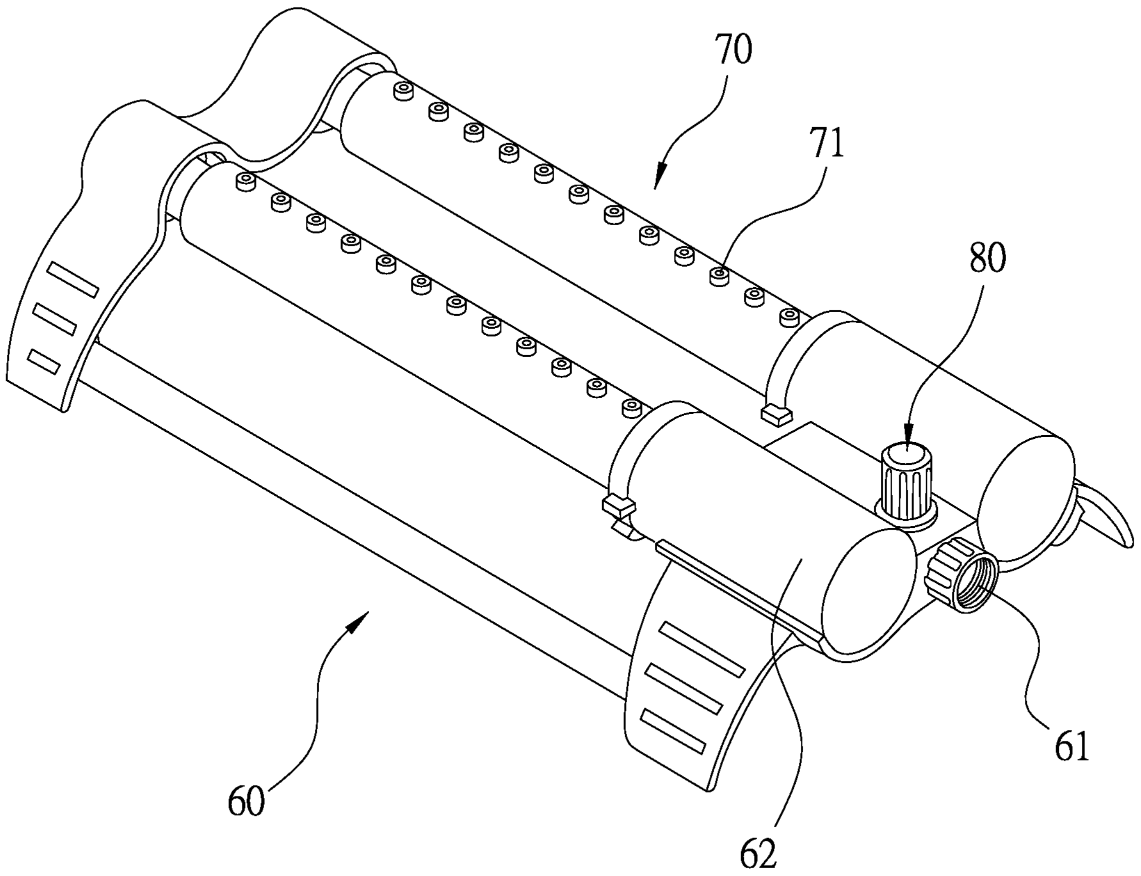
FIG. 15 PRIOR ART
FIG. 15 [PRIOR ART] is a schematic view of a conventional sprinkler.
Figure 16:
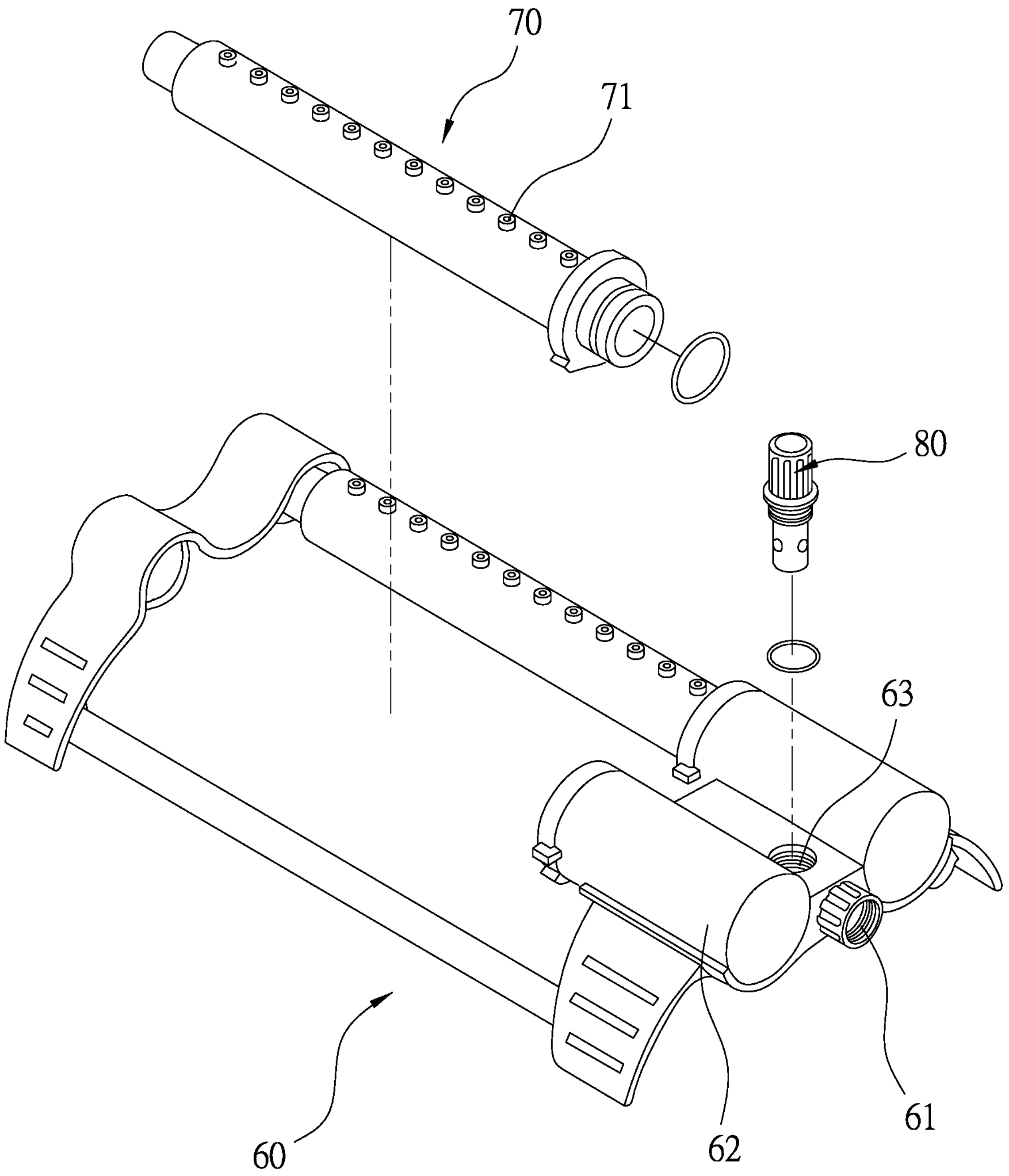
FIG. 16 PRIOR ART
FIG. 16 [PRIOR ART] is an exploded view of the conventional sprinkler.

A partition board 211 is centrally disposed at the bottom of the chamber 21 of the spray holder 20 and extended in the axial direction of the spray holder 20, as shown in FIG. 14. The partition board 211 partitions the chamber 21 into two spaces such that the two water pipes 32 in the chamber 21 are separated by the partition board 211 and thus cannot come into contact with each other or even become entangled, so as to enhance the ease of use of the sprinkler structure of the disclosure.

In conclusion, the disclosure embodies an innovative structural design that not only demonstrates improvement over the prior art but also has inventiveness and high industrial applicability. Moreover, the disclosure has never been published and has novelty. Therefore, the disclosure meets patentability requirements.

The disclosure is disclosed above by a preferred embodiment. However, the embodiment shall not be interpreted as restrictive of the scope of the disclosure. All equivalent variations and modifications made to the embodiments according to the claims shall fall within the scope of the claims of the disclosure.

What is claimed is:

1. A sprinkler structure, comprising:

a base;

a spray holder swingably disposed on the base and having a hollow core with a chamber therein, wherein an opening is formed at a top of the spray holder and is in communication with the chamber;

a water feeding valve holder having an end fitted to the spray holder and inserted into the chamber, wherein an end of the water feeding valve holder has at least two water pipes, and a connector is disposed at a free end of each of the water pipes;

a lid for covering the opening of the spray holder by being fitted thereto, wherein at least two rails are disposed on an upper surface of the lid, each having a position-limiting slot penetrating the lid, and are each in communication with the chamber through the position-limiting slot; and at least two sprinkling units slidably disposed on the at least two rails of the lid, respectively, each having a hollow core with a water feeding space therein, wherein an upper surface of each of the sprinkling units has a plurality of sprinkling pores in communication with the water feeding space, and a lower surface of each of the sprinkling units has a water feeding hole in communication with the water feeding space, allowing connectors of the water pipes to be fitted to the water feeding holes, the connectors each abutting against two ends of the position-limiting slots to not only limit a distance of slides of the sprinkling units along the rails but also prevent the sprinkling units from falling off the rails.

2. The sprinkler structure of claim 1, wherein an axle holder and a matching ring are disposed at two ends of the base, respectively, an axle is disposed at an end of the spray holder, fitted to the axle holder and adapted to rotate relative thereto, an indented portion is disposed at another end of the spray holder to give way to the matching ring, the indented portion has an end surface facing the matching ring, a through hole is disposed on the end surface of the indented portion, and the one end of the water feeding valve holder is inserted into the through hole.

3. The sprinkler structure of claim 2, wherein a position-limiting groove is concavely disposed at a lowest point of an inner circumference of the matching ring and axially extended, and a position-limiting post is convexly disposed at a lowest point of a circumference of the water feeding valve holder and axially extended, achieving restrictive positioning by engagement of the position-limiting groove and the position-limiting post.

4. The sprinkler structure of claim 1, wherein the blocking protruding portions are disposed at different ends of the at least two rails of the lid respectively, such that the at least two sprinkling units slide along the at least two rails in different directions, respectively.

5. The sprinkler structure of claim 1, wherein a plurality of spaced-apart, inward-bending position-limiting tabs are disposed at an upper edge on each of two lateral sides of each of the rails, and a position-limiting rib expanding outward is disposed at a peripheral edge of a bottom of each of the sprinkling units, allowing the position-limiting ribs to be confined to below the position-limiting tabs while the sprinkling units are moving along the rails, so as to restrain the sprinkling units.

6. The sprinkler structure of claim 1, wherein the sprinkling units each comprise a bottom case and a cover fitted together, with a positioning indented portion disposed at an edge of a sidewall of the bottom case, and a positioning protruding portion disposed at an edge of the cover, achieving quick assembly of the sprinkling units by engagement of the positioning indented portion and the positioning protruding portion.

7. The sprinkler structure of claim 1, wherein an engaging ring is disposed above a rim of the water feeding hole of each of the sprinkling units, engaged with the connector and fitted thereto.

8. The sprinkler structure of claim 1, wherein an upper surface of each of the rails of the lid has at least a positioning bump, and a lower surface of each of the sprinkling units has a plurality of positioning sunken holes equidistantly spaced apart from each other, further limiting the position of the sprinkling units on the rails by engagement of each of the positioning sunken holes and a corresponding one of the positioning bumps.

9. The sprinkler structure of claim 1, wherein a partition board is centrally disposed at a bottom of the chamber of the spray holder and extended in an axial direction of the spray holder, and thus the at least two water pipes in the chamber are separated by the partition board.

* * * * *